United States Patent
Sharma

(10) Patent No.: US 7,330,467 B2
(45) Date of Patent: Feb. 12, 2008

(54) SYSTEM AND METHOD FOR CENTRALIZED, INTELLIGENT PROXY DRIVER FOR A SWITCH FABRIC

(75) Inventor: Vipul Sharma, Germantown, MD (US)

(73) Assignee: Altera Corporation, San Jose, CA (US)

(*) Notice: Subject to any disclaimer, the term of this patent is extended or adjusted under 35 U.S.C. 154(b) by 951 days.

(21) Appl. No.: 10/396,433

(22) Filed: Mar. 26, 2003

(65) Prior Publication Data

US 2004/0190502 A1  Sep. 30, 2004

(51) Int. Cl.
*H04Q 11/00* (2006.01)
(52) U.S. Cl. ..................... 370/360; 370/392
(58) Field of Classification Search ............ 370/401, 370/252, 360, 392
See application file for complete search history.

(56) References Cited

U.S. PATENT DOCUMENTS

| | | | |
|---|---|---|---|
| 6,192,051 B1 | 2/2001 | Lipman et al. | |
| 6,314,525 B1 | 11/2001 | Mahalingham et al. | |
| 6,330,599 B1 | 12/2001 | Harvey | |
| 6,366,587 B1 | 4/2002 | Chu | |
| 6,408,061 B1 | 6/2002 | Donak et al. | |
| 6,954,463 B1* | 10/2005 | Ma et al. | 370/401 |
| 6,956,854 B2* | 10/2005 | Ganesh et al. | 370/392 |
| 7,010,715 B2* | 3/2006 | Barbas et al. | 714/4 |
| 7,031,263 B1* | 4/2006 | Sun et al. | 370/252 |
| 2002/0132620 A1 | 9/2002 | Saint-Hilaire et al. | |

FOREIGN PATENT DOCUMENTS

EP  1 077 558 A1  2/2001

* cited by examiner

*Primary Examiner*—Chi Pham
*Assistant Examiner*—Albert T. Chou
(74) *Attorney, Agent, or Firm*—Martine Penilla & Gencarella, LLP

(57) ABSTRACT

The invention provides a proxy driver in the control plane of a router or switch providing a centralized Application Program Interface (API) between a switching application and multiple device drivers in the router chassis. Another embodiment of the invention provides a centralized method for enforcing a topology in the control plane of a router. Another embodiment of the invention provides a centralized method in the control plane for the discovery of resources, for example, as cards are added or removed from the router chassis.

17 Claims, 7 Drawing Sheets

SYSTEM AND METHOD FOR CENTRALIZED, INTELLIGENT PROXY DRIVER FOR A SWITCH FABRIC

BACKGROUND OF THE INVENTION

The invention relates generally to the field of network communications. More specifically, the invention relates to a system and method for switching communications traffic at a node in a network.

Techniques for switching communications traffic at a node in a network are known. As illustrated in FIG. 1, a representative switch or router at a node in a network includes a chassis 150 populated by line cards 105, 110, 115, 120, 135, and 140, primary switch fabric card 125, back-up switch fabric card 130, and a controller card 145. Some known routers also use a back-up controller card (not shown).

The primary switch fabric card 125 and back-up switch fabric card 130 are configured to redirect network traffic (data) to one or more line cards. In turn, the line cards transmit the network traffic to a next or final destination node on the network. The primary switch fabric card 125 and back-up switch fabric card 130 can include, for example, crossbars or shared memory devices. The line cards 105, 110, 115, 120, 135, and 140 are used for buffering network traffic on either side of the switch fabric, and for performing other functions. Line cards typically serve both ingress and egress functions (i.e., for incoming and outgoing traffic, respectively).

Router communications can be separated into three categories: management plane control plane and data plane communications. The management plane is an interface between management functions external to the router (e.g., network servers or clients) and the router controller(s) for management of the router. For example, chassis configuration parameters that are derived from Service Level Agreements (SLA's) are communicated to the router on the management plane. The control plane uses local signaling protocols or other messages to control the resources of a router in accordance with the specified configuration. The data plane carries network data that is being redirected (or forwarded) by the router to the next or final destination node in the network.

In the data plane, network traffic is received at a line card, processed through the primary switch fabric card 125 (or back-up switch fabric card 130 if the primary switch fabric card 125 is not functioning), and forwarded to the (same or different) line card. The controller card 145 typically hosts switching application protocols (e.g., Open Shortest Path First (OSPF), Routing Information Protocol (RIP), Multi-Protocol Label Switching (MPLS) or other protocols) and generates messages to the line cards 105, 110, 115, 120, 135 and 140, the primary switch fabric card 125 and the back-up switch fabric card 130 in the control plane.

Known systems and methods for switching communications traffic have various disadvantageous. For example, in the control plane of known routers, a switching application must establish communications with each of the device drivers on line cards 105, 110, 115, 120, 135 and 140, the primary switch fabric card 125 and the back-up switch fabric card 130. Such a control scheme adds complexity to the development of switching applications. For example, where a line card becomes non-functional or is removed from the router chassis, the switching application must first identify the non-functional or removed card, then notify each of the device drivers associated with cards in chassis 150. Likewise, when a new card is added to chassis 150, the switching application must execute a lengthy process of registration, initialization, and configuration involving each of the device drivers. Including such complexities may extend the time-to-market for new switching applications under development.

Therefore, a need exists for a system and method to simplify the interface between a switching application and device drivers in the control plane of a network switch or router.

SUMMARY OF THE INVENTION

One embodiment of the invention provides a proxy driver in the control plane of the router or switch providing a centralized Application Program Interface (API) between a switching application and multiple device drivers in a router chassis. Another embodiment of the invention provides a centralized method for enforcing a topology in the control plane of a router. Another embodiment of the invention provides a centralized method in the control plane for the discovery of resources, for example as cards are added or removed from a router chassis.

The features and advantages of the invention will become apparent from the following drawings and detailed description.

DETAILED DESCRIPTION

The invention is directed to improving the efficiency of a router, switch, or similar network element (NE) configured to switch data in a communications network. The terms router, switch, and NE are used herein interchangeably.

Embodiments of the invention relate to the control plane of a router. In one embodiment of the invention, a proxy driver in the controller enables a centralized API to distribute resources within the chassis. Such a scheme advantageously eliminates the need for the application program to make local software calls to each line card and/or switch fabric card. In contrast to other proxy driver schemes, some embodiments of the invention use a single proxy driver to control multiple resource drivers within the router. In typical embodiments, the single proxy driver is located on a controller card, and the multiple resource drivers are on multiple line and/or switch fabric cards. Moreover, each line card or switch fabric card can include multiple resource drivers. The single proxy driver thus simplifies the application environment for intelligent switch fabric or other router products.

Each of the router resources (e.g., line cards, switch cards, and controllers) include middleware components in communication with the proxy driver. Together, the proxy driver and middleware components enable enforcement of a topology within the router chassis and facilitate intelligent discovery of chassis resources.

Subheadings used in this section are for organizational convenience, and are not meant to indicate that the disclosure of any particular feature is limited to any particular subheading used herein.

Architecture

Figure 1:
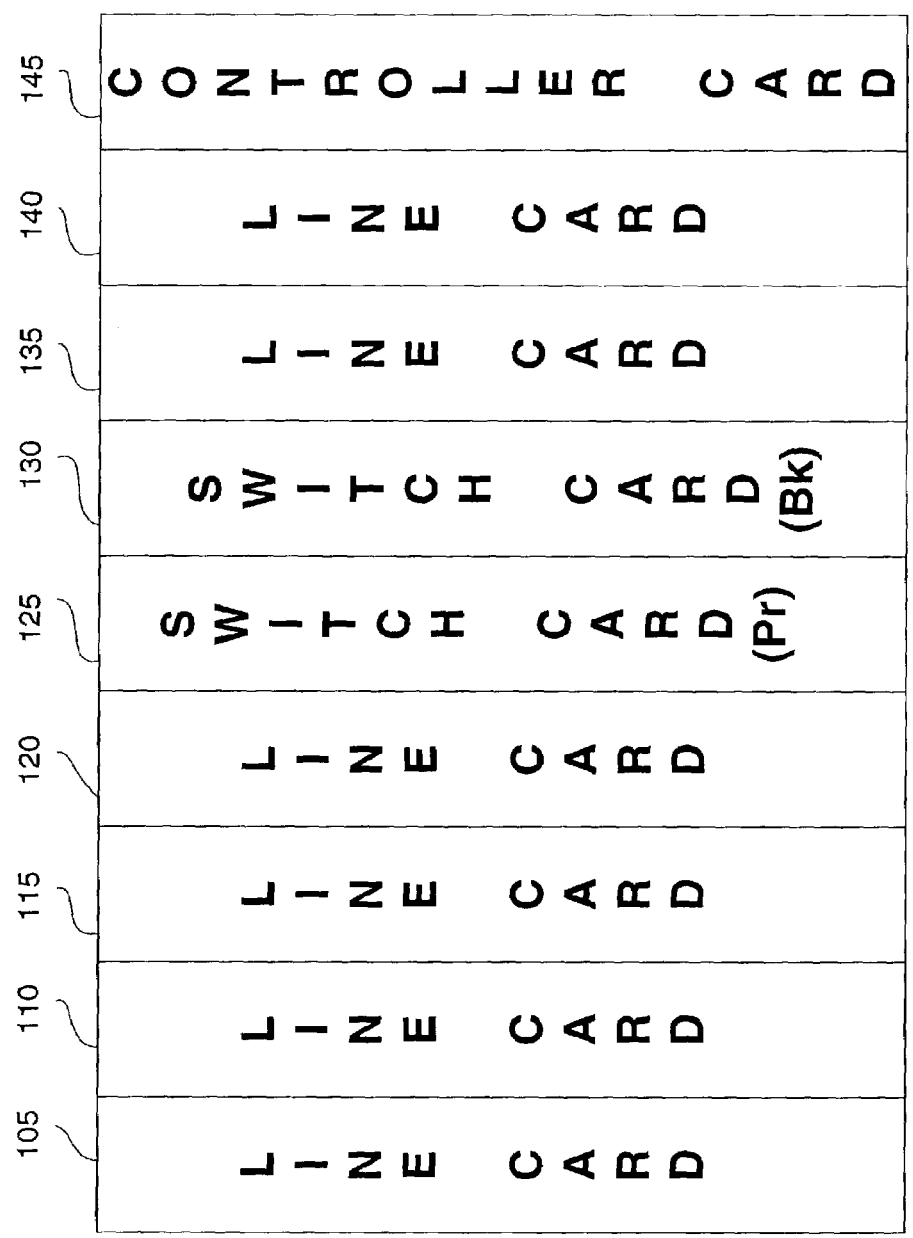
FIG. 1 is a diagram of a known router configuration.
Figure 2:
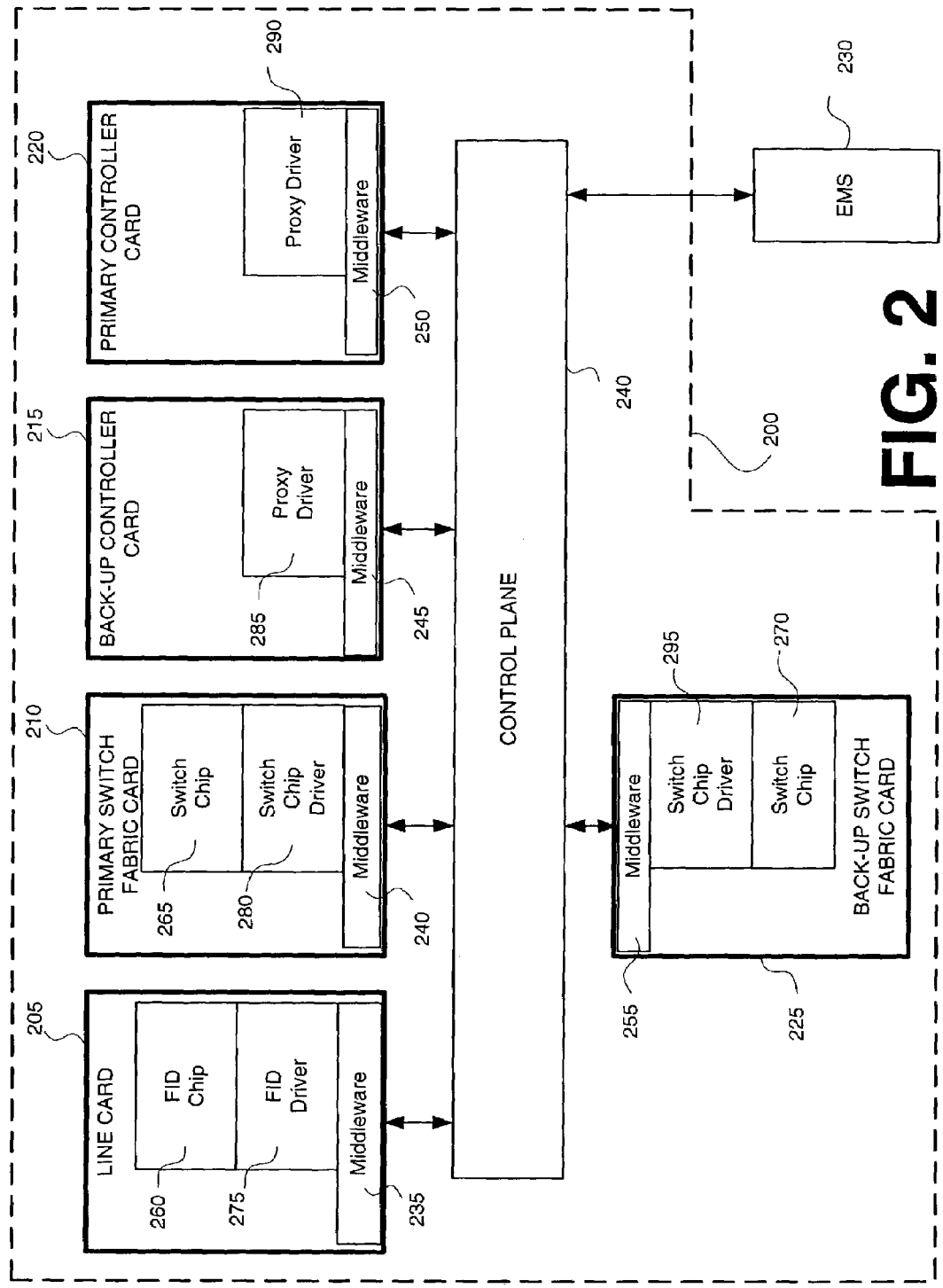
FIG. 2 is a block diagram of a system architecture for a router, according to one embodiment of the invention.

FIG. 2 is a block diagram of a system architecture for a router, according to one embodiment of the invention. In particular, FIG. 2 illustrates a control plane view of a router 200 having a line card 205, switch fabric card 210, back-up switch fabric card 225, primary controller card 220, back-up controller card 215, and an External Management System (EMS) 230. Each of the foregoing components is coupled to control plane 240. Although only one line card 205 is shown in FIG. 2, other embodiments of the invention include a router having multiple line cards 205.

In operation, the EMS 230 converts high-level policy and service level agreements (SLA's) into chassis configuration requirements, and communicates those requirements to the primary controller card 220 and/or the back-up controller card 215. Then, under the control of the primary controller card 220 or the back-up controller card 215, network traffic is switched to and/or from line card 205 through the primary switch fabric card 210 or the back-up switch fabric card 225.

Line card 205 is an ingress line card, an egress line card, or (more typically) an ingress/egress line card. In the latter case, traffic is received in one direction and sent in the opposite direction. Line card 205 includes fabric interface device (FID) driver 275, FID chip 260, and external communication ports (not shown). The line card 205 receives or sends traffic over the external communication ports and, for example, buffers incoming and/or outgoing traffic in the node and schedules data through the primary switch fabric card 210 or back-up switch fabric card 225.

FID driver 275 and FID chip 260 control the transfer of packets, cells, or other groupings of data to and/or from the primary switch fabric card 210 or back-up switch fabric card 225.

The external communication ports (not shown) provide an interface between data communication networks and the router 200. The external communication ports (not shown) can be, for example, compatible with GigE, 10/100 Ethernet, TI, E1, or other communication protocols.

The primary switch fabric card 210 includes switch chip driver 280 and switch chip 265; back-up switch fabric card 225 includes switch chip driver 295 and switch chip 270. Switch chips 265 and 270 can be, for example, crossbars for switching data packets or other divisions of data between input ports (not shown) and output ports (not shown) of switch chips 265 and 270. Switch chip drivers 280 and 295 are software or other functional modules configured to control the switch chips 265 and 270, respectively. Back-up switch fabric card 225 is a redundant capability to be used when primary switch fabric card 210 is removed from the router chassis or is otherwise non-functional.

Primary controller card 220 and back-up controller card 215 include proxy drivers 290 and 285, respectively. Proxy drivers 290 and 285 provide a centralized API in primary controller card 220 and back-up controller card 215, respectively, and may include a master topology definition for the control plane of the router as described with reference to FIG. 5 below. The centralized API controls line card 205, primary switch fabric card 210 and back-up switch fabric card 225. Back-up controller 215 is a redundant capability to be used when primary controller card 220 is removed from the router chassis or is otherwise not functional within predetermined limits.

Line card 205, switch fabric card 210, back-up switch fabric card 225, primary controller card 220 and back-up controller card 215 each include middleware components 235, 240, 255, 250, and 245, respectively. Middleware components 235, 240, 255, 250, and 245 enable the proxy driver 290 or 285 to communicate with the FID driver 275, switch chip driver 280 and switch chip driver 295. Thus, the middleware components provide an intelligent conduit between the proxy drivers, the FID drivers, and the switch chip drivers in the router.

Alternative embodiments to that illustrated in FIG. 2 do not include back-up controller 215 and/or back-up switch fabric 225. Other embodiments include additional back-up controllers and/or back-up switch fabric cards. In addition, in other embodiments multiple drivers and corresponding multiple interface chips are located on one or more cards in the router.

In embodiments of the invention, the proxy drivers 285 and 290, and middleware components 235, 240, 245, 250, and 255 enforce topology rules and perform intelligent discovery as discussed below with reference to FIGS. 3-6.

Topology Enforcement

As indicated above, proxy drivers 285 and 290 provide a centralized API in a router. In one embodiment of the invention, proxy drivers 285 and 290 dictate a messaging topology between cards in the control plane 240 of a router chassis. A topology is implemented by session objects that provide links between middleware objects in the cards of a router chassis.

Figure 3:
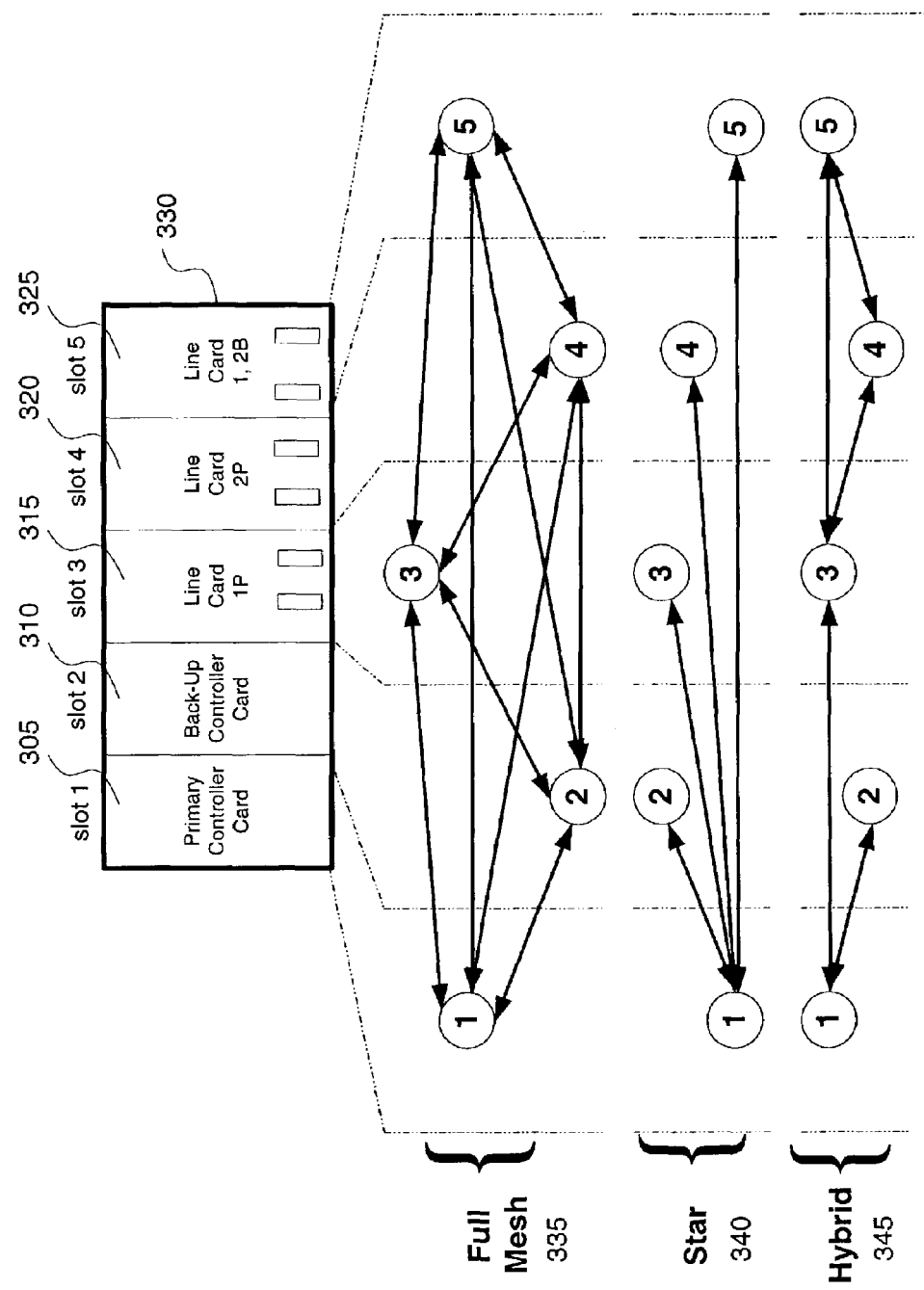
FIG. 3 is a system block diagram of a five-slot router chassis with example illustrations of router topographies, according to one embodiment of the invention.

FIG. 3 is a system block diagram of a five-slot router chassis with example illustrations of router topologies, according to embodiments of the invention. As shown therein, a chassis 330 includes a primary controller card 305, a back-up controller card 310, primary line cards 315 and 320, and a back-up line card 325.

FIG. 3 further depicts alternative topologies as point-to-point connections by flow diagrams 335, 340 and 345. Each numbered circle (1-5) represents a middleware object associated with a slot in the router chassis 330; each arrow represents a session object, link, or path between the middleware objects 1-5. In the full mesh implementation illustrated in flow diagram 335, primary CPU 305 and back-up CPU 310 are linked to the primary line cards 315 and 320, and to the back-up line card 325 as illustrated. In full mesh topologies, each middleware object is coupled to every other middleware object in the router chassis. Full mesh topologies require a larger system overhead to implement, but provide alternative routing paths allowing for graceful degradation of system performance in the event that any card in chassis 330 is removed or becomes nonfunctional. For example, if primary line card 315 goes down, messages can still be sent directly between all other slots. Full mesh architectures allow for routing of control signals with no intermediate hops between cards in chassis 330.

The star topology illustrated by flow diagram 340 requires fewer sessions to achieve the same routing characteristics of a full mesh topology. For example, the topology illustrated by flow diagram 340 includes four links, whereas the topology illustrated by flow diagram 335 includes ten links. To pass most messages in a star topology, however, data packets or cells traverse at least two hops. For example, a message between back-up line card 325 and primary line card 315 first hops from back-up line card 325 to primary CPU 305, then hops from primary CPU 305 to primary line card 315. In many cases, a star topology can gracefully degrade if an individual resource is lost. If a card is lost at the center of the star topology, however, then no further cards in chassis 330 are reachable. For example, in FIG. 3, the loss of primary CPU 305 would be fatal to a router using the star topology illustrated in flow diagram 340.

Hybrid topologies such as the one illustrated in flow diagram 345 are also possible. Note, however, that the hybrid messaging topology illustrated in flow diagram 345 typically involve intermediate hops for many different messages between cards, and that a failure at slot 3 in the illustrated example would be fatal.

In one embodiment of the invention, a system designer or other user can specify any of the topologies represented by flow diagrams 335, 340 and 345. Moreover, the centralized control provided by the proxy driver advantageously supports an environment where messaging topologies other than those described above can be readily implemented. Although not shown in FIG. 3, switch fabric cards can also be included in router control plane topology.

Figure 4A:
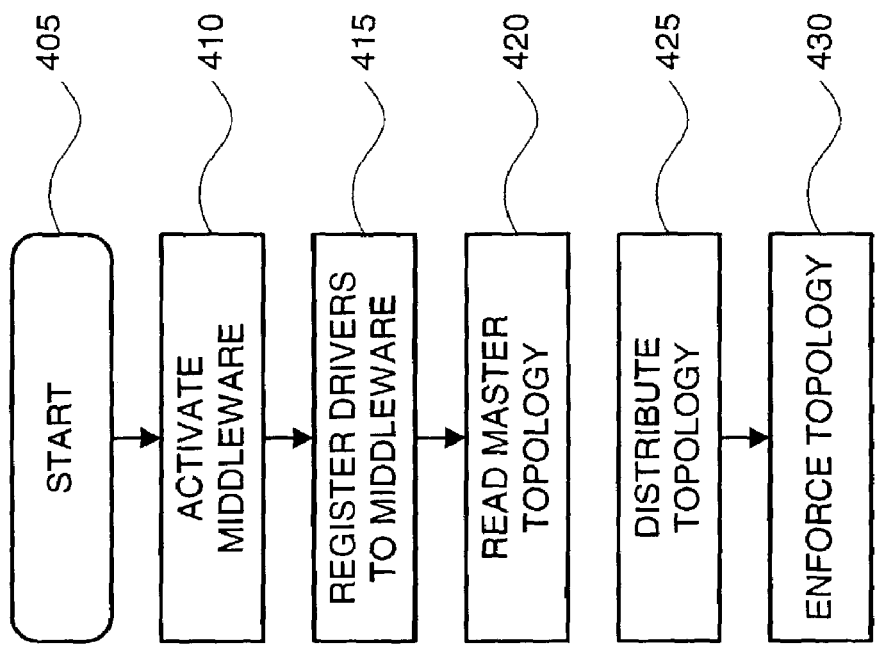
FIG. 4A is a flow diagram illustrating a method for enforcing a topology in a router, according to one embodiment of the invention.

FIG. 4A is a flow chart illustrating a process for enforcing a topology in a router, according to one embodiment of the invention related to chassis power-up. As shown therein, the process starts in step 405, for example, where at least one controller card, at least one line card, and at least one switch fabric card are plugged into a router chassis, and where all cards are addressable in the control plane. In step 410, middleware components are activated in each card. In step 415, each card registers drivers to the corresponding middleware components. For example, with reference to FIG. 2, FID driver 275 is registered to middleware component 235, Switch Chip Driver 280 is registered to middleware component 240, proxy driver 290 is registered to middleware component 250, and so on. In some embodiments, a card in the router chassis may register multiple device drivers to a single middleware component. In step 420, the master topology is provided to the middleware of the controller. For example, with reference to FIG. 2, a master topology definition resident in proxy driver 290 is provided to controller middleware component 250. In step 425, the controller middleware distributes at least the relevant portions of the topology definition to the middleware of selected cards in the router chassis. The topology is then enforced in step 430, as described below with reference to FIG. 5. Thus, in one embodiment, once a topology is stored, the power-up sequence is controlled by the process illustrated in FIG. 4A to distribute automatically the stored control plane topology (or subsets thereof) to other resources in the router chassis.

Figure 4B:
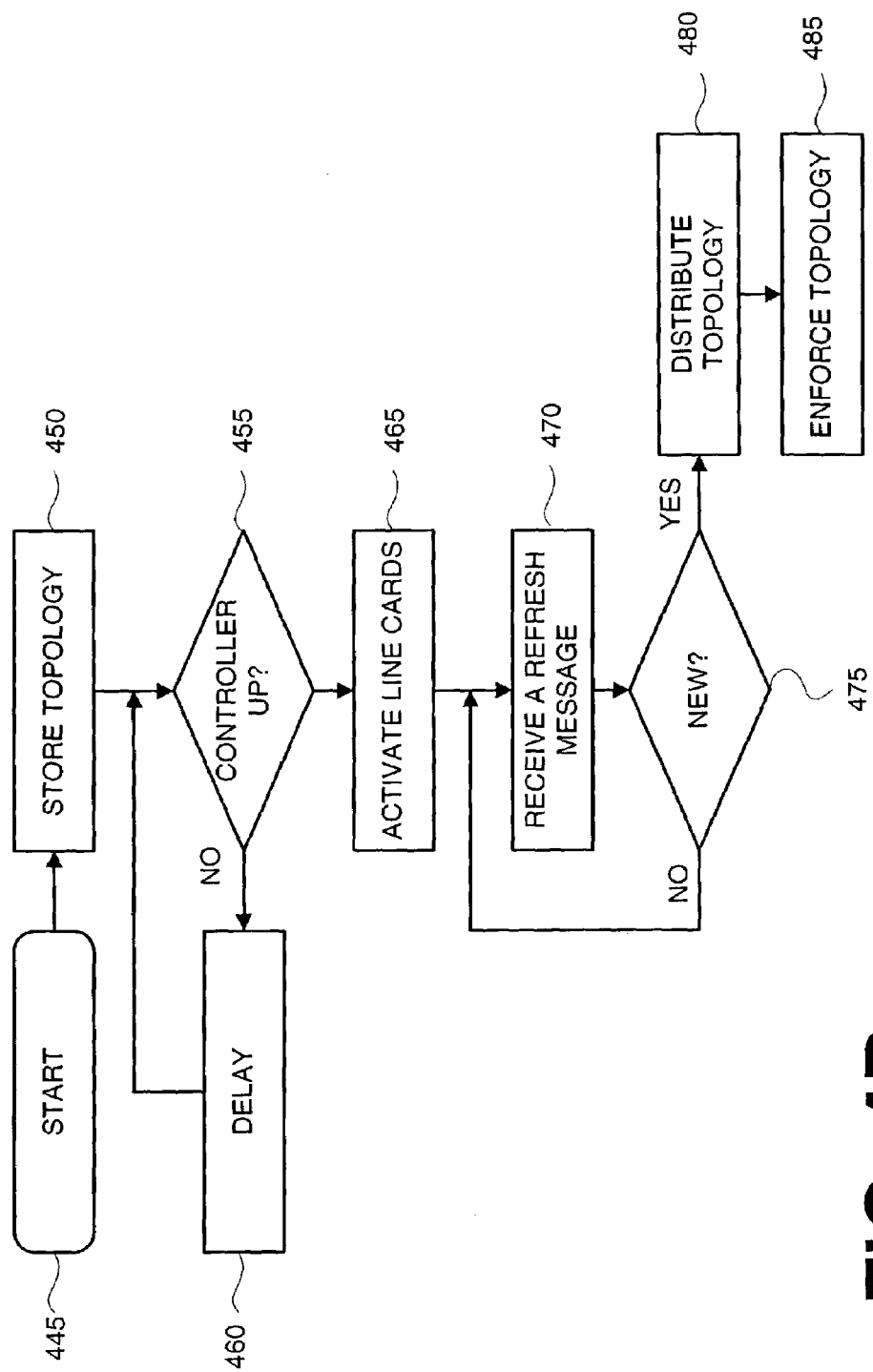
FIG. 4B is a flow diagram illustrating a method for enforcing a topology in a router, according to one embodiment of the invention.

FIG. 4B is a flow chart illustrating a process for enforcing a topology according to another embodiment of the invention. As illustrated therein, after starting in step 445, the process stores a master topology in the controller in step 450. In one embodiment, the master topology is stored in step 450 as part of an initial router configuration. In the alternative, or in combination, the master topology can be reconfigured during operation, for example from a master console accessible by a system administrator or switch operator. At conditional step 455, a determination is made as to whether the controller card is operational. If the controller is not operational, then the process advances to delay step 460 before returning to conditional step 455. If, however, it is determined in conditional step 455 that the controller is operational, then line cards and switch fabric cards are activated in step 465.

Activation causes the line cards and switch fabric cards to transmit a refresh message to the controller card (not shown in FIG. 4B). In one embodiment, activation in step 465 is according to one or more predetermined times (e.g., Monday at 1:00 pm). In the alternative, or in combination, activation in step 465 is according to a predetermined time interval (e.g., every five minutes). The controller receives the refresh message in step 470. If it is determined in conditional step 475 that the received refresh message is a new (or at least not recently received) message from a particular card in the router, then the controller transmits the stored topology definition (or a sub-set thereof) to each of the line cards and switch fabric cards in step 475, and the topology in the control plane of the router is enforced in step 480 (one embodiment described below). If however, it is determined in conditional step 475 that the received refresh message is not new (for example, the controller recently received a refresh message from the same card), then there is no need for the controller to redistribute the stored topology definition in step 480.

Accordingly, in a chassis with an operational controller, the controller periodically transmits the topology definition (or a sub-set thereof) to the line cards and switch fabric cards in response to polling from the line cards and switch fabric cards.

Figure 5:
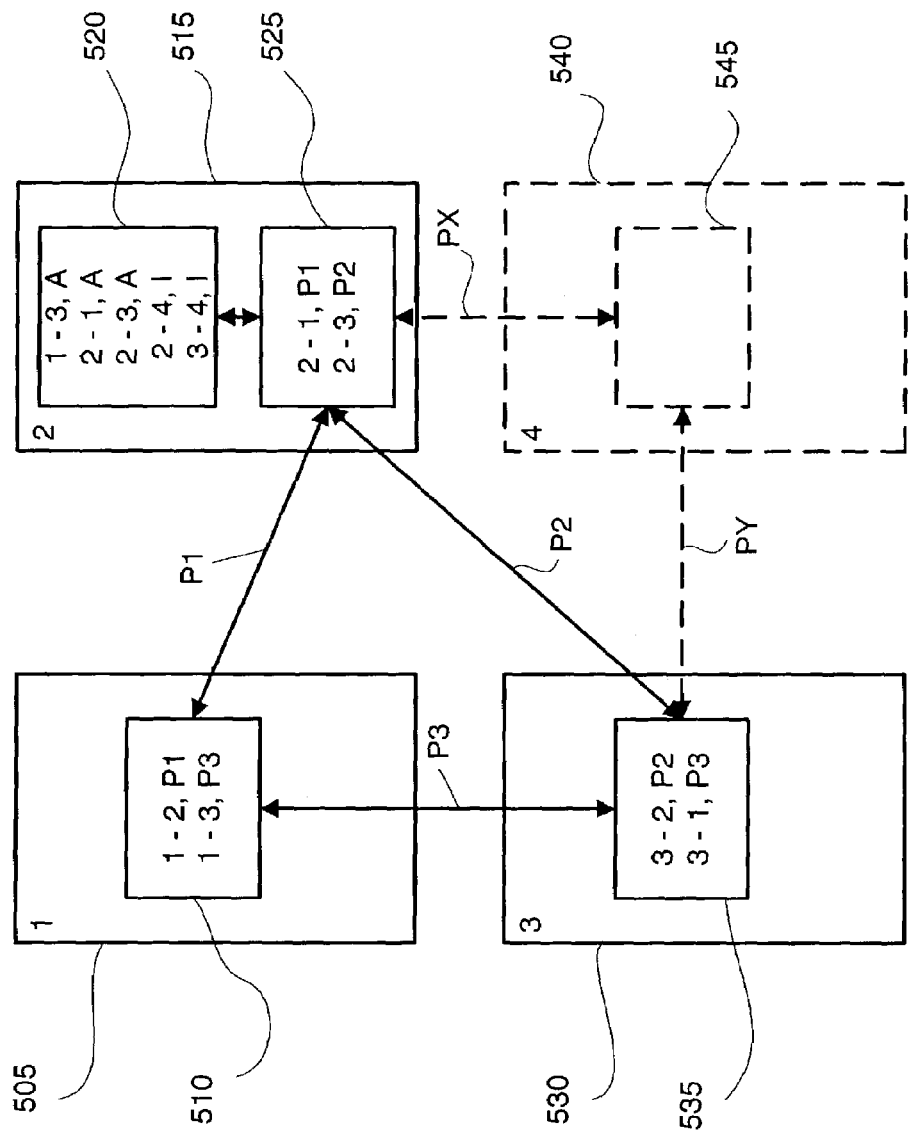
FIG. 5 is a block diagram illustrating the use of routing tables to enforce a topology within a router, according to one embodiment of the invention.

FIG. 5 is a block diagram illustrating the use of routing tables to enforce a topology within a router, according to one embodiment of the invention. In other words, FIG. 5 illustrates one embodiment of topology enforcement steps 430 and 480 in FIGS. 4A and 4B, respectively. In the illustrated embodiment, line card 505, controller card 515, and switch fabric card 530 are also known, logically, as 1, 2, and 3, respectively. Each of the cards 505, 515, and 530 include middleware components 510, 525, and 535, respectively, having local routing tables as shown therein. In addition, controller card 515 includes proxy driver 520 having a master topology definition as shown therein. Line card 540 (having middleware 545) represents a card that can be later added, and is discussed with reference to the discovery process below.

In operation, a topology is defined in the master topology definition of proxy driver 520. In the illustrated embodiment, the master topology definition of proxy driver 520 defines sessions between: logical cards 1 and 3 (1-3); logical cards 2 and 1 (2-1); logical cards 2 and 3 (2-3); logical cards 2 and 4 (2-4); and logical cards 3 and 4 (3-4). In the illustrated embodiment, the master topology definition also includes parameters to indicate active (A) or inactive (I) sessions. Because logical card 4 is not installed, sessions related to the uninstalled card 540 are inactive (I).

Middleware components 510, 525, and 535 instantiate the chassis topology in each of the cards 505, 515, and 530, respectively. In the illustrated embodiment, only relevant portions of the overall topology for the control plane are stored by each middleware component as local routing tables. Thus, from the perspective of middleware component 510, the valid sessions are: session PI between itself (logical 1) and controller card 515 (logical 2); and session P3 between itself (logical 1) and switch fabric card 530 (logical 3). Likewise, from the perspective of middleware component 535, the only valid sessions are: session P2 between itself (logical 3) and controller card 515 (logical 2); and session P3 between itself (logical 3) and line card 510 (logical 1). Middleware component 525 recognizes: session PI between itself (logical 2) and line card 505 (logical 1), and also session P2 between itself (logical 2) and switch fabric card 530 (logical 3). Thus, in the illustrated embodiment, a full mesh topology in the control plane of a router is enforced by proxy driver 520 and middleware components 510, 525, and 535.

Changes to the master topology definition of proxy driver 520 allow for alternative control plane topologies. In the illustrated embodiment of FIG. 5, sessions 2-4 and 3-4 are defined in the master topology definition of proxy driver 520, but not implemented due to the absence of a card having the logical designator of 4. Specification of control plane topology for uninstalled cards is not required, but advantageously enables dynamic expansion of the router topology, for example where line card 540 is later added to the router chassis. As described above, the master topology definition can also be changed dynamically, for example by a user at a master console, or, for instance, in response to a changed configuration from EMS 230. Embodiments of the invention thus provides a high degree of flexibility in implementing changed topologies in the control plane of a router, enabled by the centralized control of the proxy driver and by the distributed middleware components.

Discovery

Figure 6:
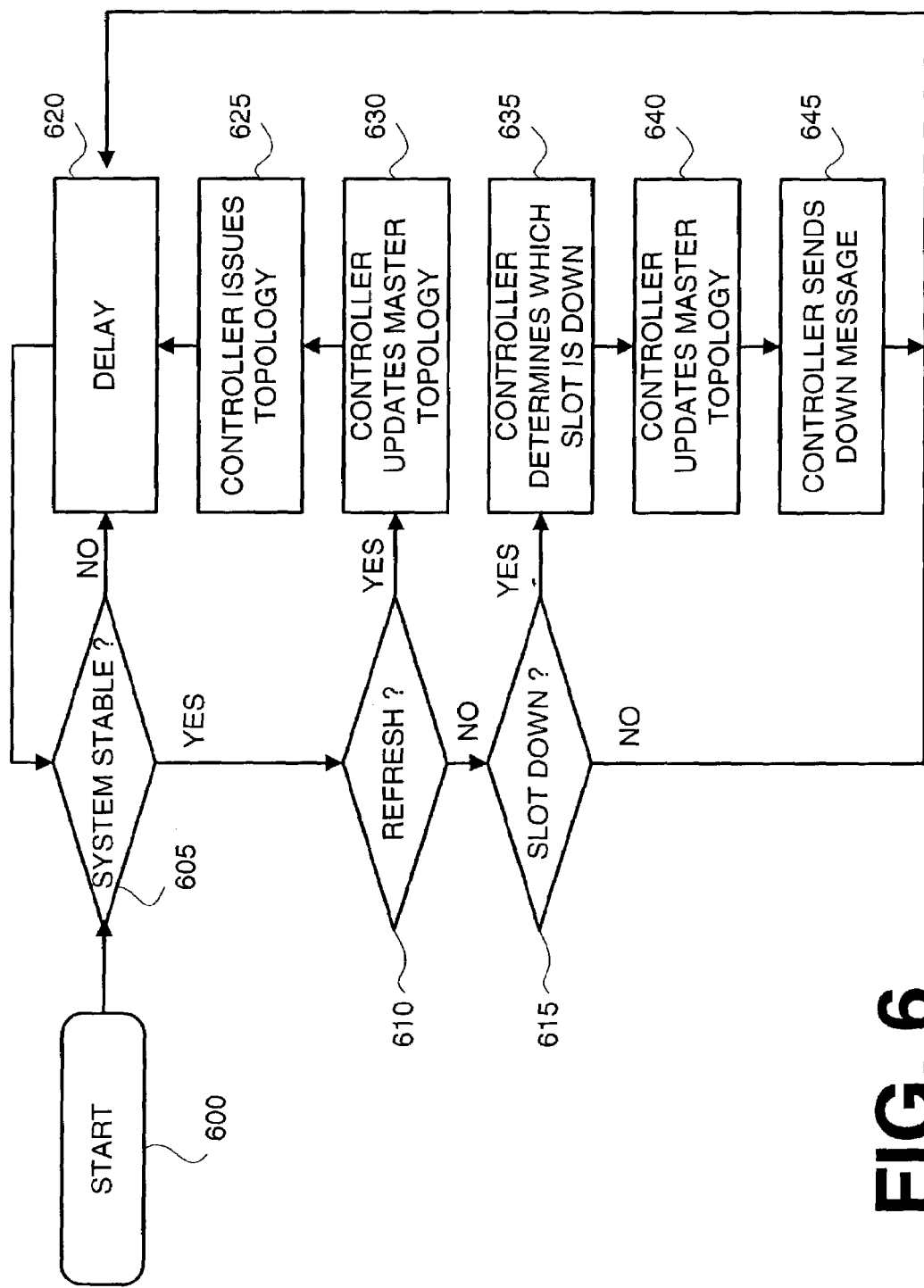
FIG. 6 is a flow diagram illustrating a discovery process, according to one embodiment of the invention.

FIG. 6 illustrates process flow diagram for performing discovery, according to one embodiment of the invention. In one respect, as used herein, discovery relates to the identification and integration of a card plugged into a slot of a stable router chassis. Without such capability, a router would have to be shut down, or at least rebooted to add resources to the router chassis. In another respect, as used herein, discovery relates to the identification and accommodation of a card that fails or is removed from a stable router. Without being able to identify and adapt to lost resources, any failure in the chassis could potentially cause the entire router to become non-operational.

As illustrated in FIG. 6, after starting in step 600, the discovery process executes conditional step 605 by determining in the controller card whether the system is stable. If the system is not stable, the process advances to delay step 620 before returning to conditional step 605. If, however, it is determined in conditional step 605 that the system is stable, the process advances to conditional step 610 where a determination is made as to whether a refresh message has been received by the controller.

With reference to both FIGS. 5 and 6, a refresh message is generated by middleware 545 of line card 540 when line card 540 is plugged into a slot of an already stable system. Accordingly, if it is determined in step 610 that a refresh message has been received in the controller card 515, the controller card 515 updates the master topology definition in step 630 to change the status of the 2-4 and 3-4 sessions from inactive (I) to active (A). Then, in step 625, the controller card 515 sends the updated topology (or an applicable sub-set thereof, or a message indicating the pertinent changes) to middleware 545 of line card 540. Accordingly, middleware component 545 enforces a topology of the form "4-2, PX" and "4-3, PY." Also in step 625, the controller card 515 sends the updated topology (or at least an applicable subset thereof) to middleware component 535 of switch fabric card 530, and middleware component 535 enforces a topology of the form "3-4, PY." PX and PY are newly-defined sessions in accordance with the topology supplied by the controller 515. Note that in the foregoing example related to the addition of line card 540, no need exists for the controller to update the topology of line card 505 because since no sessions are defined in the master topology definition between line card 505 and line card 540.

If it is determined in conditional step 610 that a refresh message has not been received at the controller within a predetermined time, then the process advances to conditional step 615. There are at least two ways for determining that a slot is down in step 615. In a first case, a router resource may detect a failure, and notify the controller card that the router resource is non-functional. For example, if on-card diagnostics of switch fabric card 530 detect a failed switch chip, then middleware component 535 can inform the controller card 515 that the switch fabric card 530 is non-functional. Alternatively, or in combination, the controller card 515 can poll all chassis resources at a predetermined time or interval. If a card is removed from a slot in the chassis, or if a card is no longer functioning, attached session objects will (immediately or eventually) cease to operate. Thus, if controller card 515 polled switch fabric card 530 and failed to receive the appropriate response, then the controller card 515 would have an indication the switch fabric card 530 (slot 3) is non-functional.

If it is determined in conditional step 615 that a slot-down message has been received, the process advances to step 635 where the controller card 515 determines which slot is not operational. Where a slot down message was received at the controller card 515 from another resource in the chassis, the received message may itself contain the slot information. Alternatively, where the controller discovered a non-functional card via polling, the polling logic may identify the non-functional slot.

Once it is determined which slot is not operational, the process advances to step 640 where the controller card 515 updates status parameters in the master topology definition. For example, if the controller determined that slot 3 is down, then it would change "1-3, A" to "1-3, I," and further change "2-3, A" to "2-3, I."

Next, the process advances to step 645 where the controller transmits a slot-down message to each middleware component previously having a valid session with the non-functional card to update local topology definitions. Thus, if it were determined that slot 3 is non-functional, the controller card 515 would notify middleware components 525 and 510. In response, middleware 525 would delete the "2-3, P2" entry from its local routing table, and middleware 510 would delete "1-3, P3" from its local routing table. In an alternative embodiment, instead of sending a slot-down message, the controller sends replacement topology definitions (or applicable sub-sets thereof) to middleware components 525 and 510.

If it is determined in step 615 that a slot-down message has not been received, the process advances to delay step 620. The process also advances to delay step 620 after executing steps 625 and 645.

Accordingly, the proxy driver and middleware components advantageously enable an intelligent discovery process enabling the router to adapt dynamically to changes in router chassis resources.

The methods described herein can be embodied in processor-executable code, and may further be stored in processor-readable medium (e.g., hard disk, CD ROM, or other storage device).

CONCLUSION

The invention described above thus overcomes the disadvantages of known systems by providing a centralized application program interface to simplify the development of switching applications and reduce time-to-market. In addition, when combined with middleware components on each card in the router chassis, topology enforcement and intelligent discovery are enabled.

While this invention has been described in various explanatory embodiments, other embodiments and variations can be effected by a person of ordinary skill in the art without departing from the scope of the invention.

What is claimed is:

1. A computer readable medium storing computer software for enabling an intelligent discovery process for a router to adapt dynamically to changes in router chassis resources, wherein the software comprising codes for performing:
   a plurality of line card drivers, each of the plurality of line card drivers being uniquely associated with a line card device from a plurality of line card devices and configured to control the uniquely associated line card device;
   at least one switch fabric driver, each of the at least one switch fabric drivers being associated with a corresponding one of at least one switch fabric device and configured to control the corresponding one of the at least one switch fabric devices;
   a plurality of middleware components, each of the plurality of middleware components being included in a corresponding one of the plurality of line card drivers or the at least one switch fabric driver to enable communication with the single proxy driver, wherein each of the plurality of middleware components include a corresponding one of a plurality of local routing tables, each of the plurality of local routing tables including at least a portion of a master topology definition; and
   a single proxy driver in communication with the plurality of line card drivers and the at least one switch fabric driver, the single proxy driver being configured to control the plurality of line card devices and the at least one switch fabric device.

2. The computer readable medium storing computer software of claim 1, wherein the single proxy driver includes the master topology definition to define a topology in the control plane of a router.

3. The computer readable medium storing computer software of claim 2, wherein the master topology definition includes one of a full mesh, star, and hybrid configuration.

4. The coputer readable medium storing computer software of claim 1, wherein each of the plurality of middleware components are configured to send a refresh message upon activation, the refresh message requesting updates to the corresponding one of the plurality of local routing tables.

5. The computer readable medium storing computer software of claim 1, wherein each of the plurality of middleware components are configured to send a refresh message at one of a predetermined time and a predetermined time interval, the refresh message requesting updates to the corresponding one of the plurality of local routing tables.

6. The computer readable medium storing computer software of claim 1, wherein each of the plurality of middleware components are configured to send a slot down message upon detection of a non-functioning line card or switch fabric card associated with a corresponding one of the plurality of middleware components.

7. A method for controlling a router, comprising:
   storing a master topology definition in a single proxy driver of a controller card, the master topology definition related to a control plane in the router;
   storing a local routing table in each of a plurality of middleware components, the plurality of middleware components being uniquely associated with corresponding resources in the router, the local routing table including at least a portion of a master topology definition;
   receiving a request for a topology message from at least one of the plurality of resources in the router through a corresponding middleware component; and
   transmitting the topology message from the controller to the at least one of a plurality of resources in the router, the topology message based on the master topology definition.

8. The method of claim 7, wherein storing the topology definition includes storing one of a full mesh, star, and hybrid configuration.

9. The method of claim 7, wherein receiving is performed at one of a predetermined time and a predetermined time interval.

10. The method of claim 7, wherein transmitting the topology message includes sending a relevant portion of the master topology definition.

11. The method of claim 7, further comprising:
    receiving a refresh message at a controller in the router, the refresh message being received from a first middleware component from the plurality of middleware components;
    updating the master topology definition based on the refresh message; and
    sending an updated topology message from the controller to each of the plurality of middleware components based on the updated master topology definition.

12. The method of claim 11, wherein sending the updated topology message includes transmitting a local topology replacement, the local topology replacement being relevant to at least the selected one of the plurality of router resources.

13. The method of claim 11, further comprising:
    determining whether a slot in the router is non-functional, the slot being uniquely associated with a first router resource from the plurality of router resources;
    updating the master topology definition based on the non-functional slot if the slot is nonfunctional; and
    sending a next topology message from the controller to each of the plurality of router resources if the slot in the router is non-functional.

14. The method of claim 13, wherein determining whether the slot is down includes polling the plurality of router resources at one of a predetermined time and a predetermined time interval.

15. The method of claim 13, wherein sending the topology message includes transmitting only to the each of the plurality of router resources that are affected by the non-functional slot.

16. The method of claim 13, wherein sending the topology message includes transmitting an indication of which slot is non-functional.

17. The method of claim 7 wherein each of the resources in the router are line card drivers.

* * * * *